(No Model.)
J. J. McCLEN.
Cultivator Tooth.
No. 240,159.          Patented April 12, 1881.
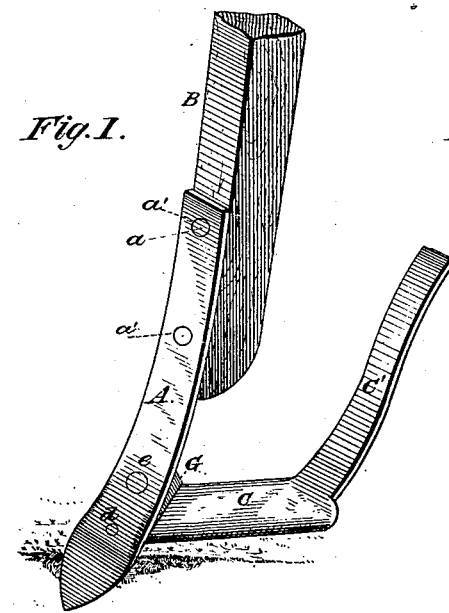
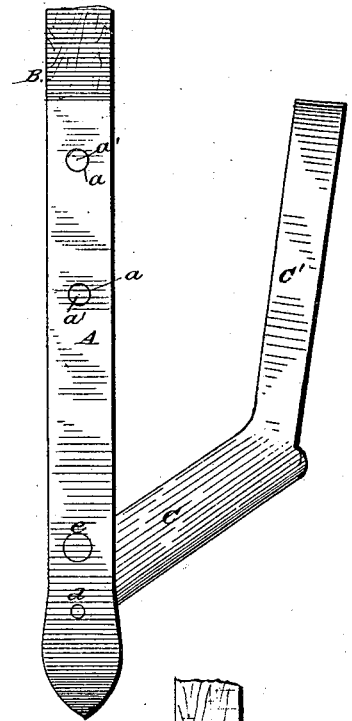
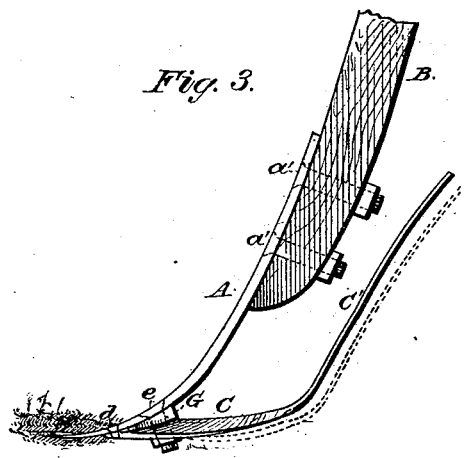
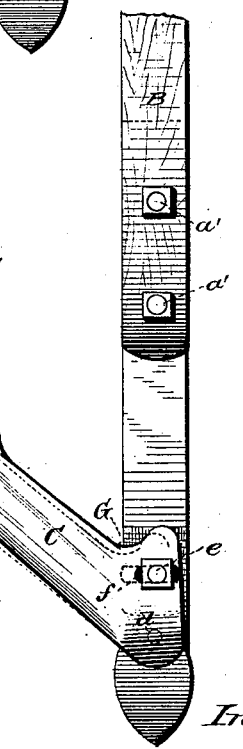
Witnesses
Fred G. Dietrich
A. H. Krause
Inventor:
John J. McClen
By W. B. Richards
Atty.

UNITED STATES PATENT OFFICE.

JOHN J. McCLEN, OF ROSEVILLE, ILLINOIS, ASSIGNOR OF ONE-HALF TO ALEXANDER KREIG AND JOHN PHIMISTER, OF SAME PLACE.

CULTIVATOR-TOOTH.

SPECIFICATION forming part of Letters Patent No. 240,159, dated April 12, 1881.

Application filed December 13, 1880. (No model.)

*To all whom it may concern:*

Be it known that I, JOHN J. McCLEN, a citizen of the United States, residing at Roseville, in the county of Warren and State of Illinois, have invented certain new and useful Improvements in Cultivator-Teeth; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is an isometric perspective of a cultivator-tooth embodying my invention. Fig. 2 is a plan, seen from above and forward. Fig. 3 is a side elevation. Fig. 4 is a plan seen from below.

This invention relates to improvements in cultivator shovels or teeth; and the object of the improvements is to produce a cultivator shovel or tooth adapted, by its peculiar construction, to the cultivation of corn or other plants in rows and while they are still small.

Referring to the drawings by letters, letter A represents a narrow plate of steel or other suitable material, curved forward, and sharpened at its lower end, in the form of what is generally known as a "bull-tongue," and is pierced with holes $a$, through which bolts $a'$ may pass to secure it to any ordinary cultivator-standard, B, as shown in the drawings. A plate with its front side sharpened is secured at one end to and near the lower end of the plate A, as hereinafter described, and extending laterally and rearwardly from the plate A forms the wing C, from which an arm, C', extends rearward and upward, as shown at Fig. 3. The arm C' is some distance to one side of the plate A, as shown at Fig. 2, and is somewhat in rear of same plate, as shown at Fig. 3. The wing C may be formed integral with the plate A by cutting, bending, or otherwise forming both from the same plate of metal, or it may be welded thereto, or attached in any desired manner; but I prefer securing it by a pivot-bolt or rivet, $d$, and a bolt and nut, $e$. The bolt $e$ passes through a hole in the plate A and through a slot, $f$, in the wing C, by means of which the wing and arm C' may be adjusted laterally, as shown by dotted lines at Fig. 4. Wedge-shaped plates G of different thicknesses may be placed between the wing C and plate A, to lower the outer end of the wing C and change the inclination of the arm C', as shown by dotted lines at Fig. 3.

In operation the plate A runs next to the row of small plants and penetrates and loosens the soil, and as it is narrow, and inclines but little, if any, to either side, it will throw but little, if any, soil onto the small plants. The wing C runs beneath the surface of the soil and loosens and stirs it, and at the same time cuts off the roots and tears up the weeds growing in its path, and the loose soil raised and moved by said wing will pass backward over it and fall in rear of it and between the plate A and arm C', and not come in contact with the plants. The arms C' will act as a stirrer to loosen and pulverize the soil which it passes through, and which may be thrown against it by the wing C. The lumps and clods will pass backward along the wing C and fall behind and outside of the arm C'.

It will thus be seen that with my improved cultivator-tooth small plants may be cultivated by running the straight side next the plants without danger of covering the plants, and at the same time thoroughly pulverize the soil and cut or tear out the weeds, and that at the time most necessary and effectual—that is, while the plants are small.

What I claim as new, and desire to secure by Letters Patent, is—

1. A cultivator-tooth in which a bull-tongue or plate, A, forms one side thereof, and from which a wing, C, having an arm, C', extends laterally and rearwardly, substantially as and for the purpose specified.

2. In combination with the bull-tongue or plate A, the wing C, having an arm, C', and adjustably secured to the plate A by the wedge-shaped block G and bolts $d$ and $e$, substantially as and for the purpose specified.

In testimony whereof I affix my signature in presence of two witnesses.

JOHN J. McCLEN.

Witnesses:
J. W. PECK,
T. G. HARPER.